May 30, 1933.   J. H. MATTHEWS ET AL   1,911,765
METHOD OF FORMING A RUBBER STENCIL SHEET
Filed June 23, 1931
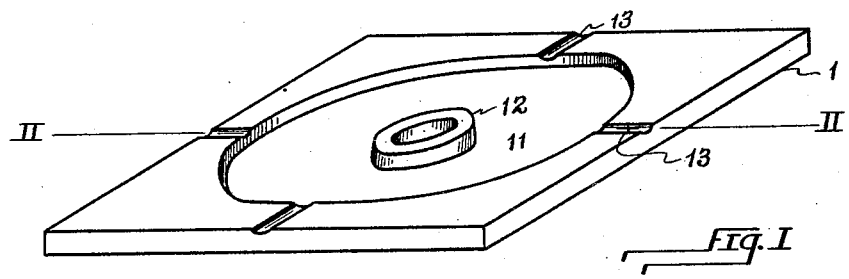
Fig. I
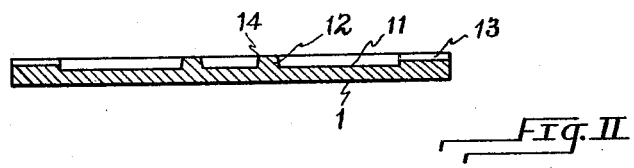
Fig. II
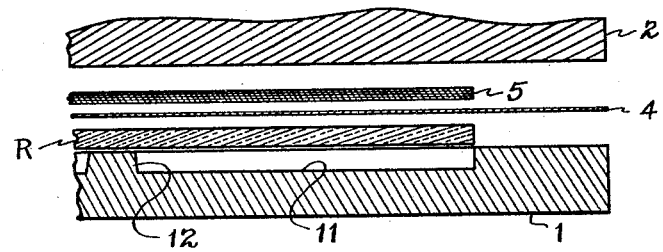
Fig. III
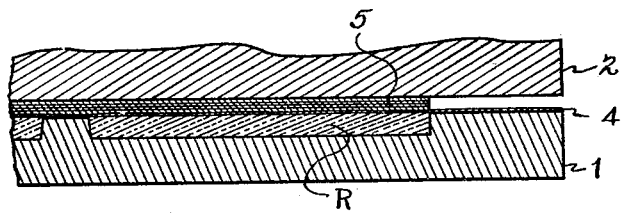
Fig. IV
INVENTORS
James H. Matthews
and
Lee M. Harley
by Christy, Christy & Wharton
their attorneys Patented May 30, 1933

1,911,765

UNITED STATES PATENT OFFICE

JAMES H. MATTHEWS, OF PITTSBURGH, PENNSYLVANIA, AND LEE M. HARLEY, OF BROOKLYN, NEW YORK, ASSIGNORS TO JAS. H. MATTHEWS & CO., A CORPORATION OF PENNSYLVANIA

METHOD OF FORMING A RUBBER STENCIL SHEET

Application filed June 23, 1931. Serial No. 546,268.

This invention relates to the moulding of plastic material articles, and finds practical application in the production of stencil sheets of rubber. The end achieved is a rubber stencil sheet of superior quality, produced with greatest economy.

In the accompanying drawing Fig. I is a view in perspective of one of a pair of mould members between which, in the practice of our invention, a stencil sheet is moulded and vulcanized; Fig. II is a view of this mould member in transverse section, on a plane indicated by the line II—II, Fig. I; Figs. III and IV are diagrammatic views, illustrative of the moulding operation.

A stencil sheet, with the meaning and significance here contemplated, is a sheet of material whose continuity is interrupted by openings, ordinarily in the form of legible characters or pictorial design. The sheet is applied to the surface of another body, and then through the openings in the sheet the other body is subjected to treatment—perhaps by the application of paint, perhaps by a blast of sand, perhaps in some other manner—with the consequence and effect that, while the masked portions of the surface of the body are protected, the exposed portions have undergone the desired change, in color, texture, or other condition. The stencil sheet is ordinarily used in successive application to a plurality of identical bodies to be branded or otherwise acted upon. Stencil sheets are commonly formed of metal—of brass, for example. Rubber stencil sheets have advantage in particular circumstances: they shape themselves to the surfaces of the bodies to which they may be applied, in a way that sheets of metal do not; and they have durability in sand-blasting operations, for instance, greater than that of stencils of sheet metal. In order best to endure conditions of use, the rubber stencil sheet should be of relatively great softness and elasticity, and the problem is economically to produce a rubber stencil sheet of accurately predetermined dimensions, free of warp and distortion, with openings accurately corresponding to the pattern. Particularly is it difficult to produce a rubber stencil sheet if the pattern for the openings be intricate.

Rubber stencil sheets ordinarily are formed by cutting with a knife openings of desired design in a previously vulcanized sheet of rubber. It has not hitherto been practical to mould unvulcanized rubber between mould members which bear in relief the desired design, and then to vulcanize the material within the mould; because relatively thin webs of rubber have remained, closing the bottoms of the recesses formed in the body of rubber by the characters which rise in relief upon one of the mould members, and it has been necessary in an ensuing operation to cut away these webs. Such an operation of cutting away has been found to be time-consuming, of course, and, additionally, it has introduced into a procedure otherwise mechanical an element of uncertainty. The cutting-away may not be done with precision, and there is little or no gain or advantage over the procedure first indicated, of cutting the openings in a previously vulcanized, plain sheet. The present invention is found in a refinement in the procedure of moulding and vulcanizing, in consequence of which the delicate hand-finishing operation is no longer required; time is saved, and the liability to inaccuracy is avoided. Furthermore, the stencil sheet produced according to the invention is in other respects superior.

Referring to the drawing, the lower and recessed mould member 1 is shown in Fig. I. It is of usual, essentially plate-like, form: the central area 11 is sunk to a depth which determines the thickness of the finished stencil sheet. From the area of the sunken portion 11 rise in relief the characters or design 12, which define the openings in the finished stencil sheet. These characters or this design may be of any desired shape, size, and intricacy—within the limits, of course, of the sunken area 11. The portions in relief rise to the height of the margin of the mould member—that is to say, they are of equal height with the depth of the sunken area 11. They are approximately squarecornered, with a slight tapering from their bases to their upper faces—a feature which, for purposes of illustration is, in the drawing, exaggerated. The upper edges 14 of the raised characters or design are minutely shaped to an approximate right angle, and so present a fine edge. The marginal portion of the mould member 1 is provided, as is usual, with the relief grooves 13, to afford ready escape of gases during the pressing and vulcanizing operation. The upper mould member 2, diagrammatically shown in Figs. III and IV, is plane-surfaced. The mould members are formed of metal, and they may be understood to be mounted in and to constitute the material-engaging parts of a vulcanizing press. The mould member 2, indeed, may be one of the two opposed members of the vulcanizing press itself; and the mould member 1 may be removably borne upon the companion press member.

The invention lies in bringing to bear upon the upper surface of the blank of unvulcanized rubber when introduced and operated upon in the press, not the naked nether face of the upper mould member, but the upper mould member faced with an interposed body 5 of more yielding material. By virtue of the presence of this body of more yielding material, the moulding pressure is effective to diminish the thickness of the membrane of rubber which otherwise, when the press is closed, remains, overlying the raised characters or design 12. Indeed, with nice attention to details, all trace of such a membrane may be eliminated, and a finished stencil may be produced in the vulcanizing press—a stencil sheet requiring no corrective operation upon it. And even though some trace of such membrane may remain, it may be removed expeditiously and without any inaccuracy of result, merely by rubbing the moulded and vulcanized article, after the mould is opened and while the article remains still in situ on the lower mould member 1, with a sheet of sandpaper.

The particular procedure which we follow in the practice of our invention is as follows. The mould member 1 is dusted with fine talc, blown clean, introduced into the vulcanizing press, and heated to vulcanizing temperature. A sheet of unvulcanized rubber of proper compounding (the character of which we have indicated above) is cut to the peripheral shape and size of the sunken area 11 of the lower mould member 1. The sheet of unvulcanized rubber will be initially of thickness substantially equal to or slightly greater than the depth of the sunken area 11 of the member 1. Such a blank R is first dusted over with talc, and then, the press having been opened and member 1 withdrawn, the blank is applied upon the mould member, and brought to a position of accurate registry with the sunken area 11. Medially it rests upon the raised characters or design 12. A sheet 4 of Holland is then applied, of such size as not only to cover the upper surface of the blank R, but to extend and overlie on all sides the marginal portions of member 1. Holland is a known material; it is fine-woven linen cloth, sized with starch, a material which renders it a flexible incompressible heat-resistant sheet material, with glazed surface, to which rubber will not adhere, even when heated to vulcanizing temperature. Upon the applied sheet of Holland a layer 5 of paper is laid. Conveniently, we have employed a heavy, tough paper known as unoiled stencil paper. It is a highly compressed, smooth-surfaced paper, and in actual procedure we have applied four layers of such paper in superposition. The paper is accurately cut to the peripheral shape and dimensions of the sunken area 11 in mould member 1, and is applied in accurate registry with that sunken area and with the blank of rubber R already applied. Although the paper used is compressed and dense, the facing so prepared for the upper mould member is, as compared with the metal mould member itself, of yielding character, and by virtue of this yielding character, the paper facing is effective to the end in view. The mould bearing its burden is then reintroduced into the vulcanizing press, the press is closed, and pressure applied, and the press and its contents are held for proper time at proper temperature. In the operation as we perform it, the time is twenty-five minutes and the temperature 308° F. At the end of this time the press is opened and the mould member 1 withdrawn. The rubber will be found to have been moulded and vulcanized to a stencil sheet with the desired openings accurately formed, and with little or no rubber overlying the faces of the characters or design 12. If there be any, it may readily be removed by rubbing the exposed surface of the article while still it rests in the mould with a sheet of sandpaper. The finished stencil sheet may easily be stripped away from the mould. The stencil sheet will be found to be free of warping and flatter than the rubber stencil sheets heretofore produced.

The invention, manifestly, is applicable generally to the fabrication of orificed articles of plastic and (ordinarily) vulcanizable material.

Dimensions and details of time and temperature have been given by way of example merely, and details of procedure have been mentioned such as are common to all such operations.

We claim as our invention:

1. The method herein described of forming a rubber stencil sheet which consists in pressing a blank of green sheet rubber beneath a plane-surfaced mould member of incompressible material faced with a layer of yielding material and into a recess of corresponding outline and depth formed in the otherwise plane face of a companion mould member also formed of incompressible material, such companion mould member bearing within such recess a design rising in relief to a height equal to the depth of the recess and having a plane upper face, and, in so pressing the blank, driving substantially all of the rubber from the upper face of the design and causing substantially all of the rubber to accumulate within the recess and around the design raised in relief therein, and, after such redistribution of the rubber has so been effected, and while the mould members continue in closed position, effecting vulcanization of the moulded material.

2. The method herein described of forming a rubber stencil sheet which consists in pressing upon an incompressible mould member having a shallow recess in its otherwise plane surface, with a plane-faced design rising in relief within such recess to a height equal to the depth of the recess, and beneath a companion plane-faced incompressible mould member faced with a yielding layer overlaid with a layer of incompressible heat-resistant material non-adherent to rubber, a blank of green sheet rubber of uniform and unbroken thickness throughout its extent and of outline and thickness corresponding to the outline and depth of said recess and laid in registry with the said recess, and in so doing causing the rubber to migrate with substantial completeness from the face of the raised design and to accumulate with substantial completeness within the said recess and around the sides of the said design, and, after such redistribution of the rubber has been effected, and while the mould members continue in closed and pressing position, effecting vulcanization of the material so closed and shaped between them.

3. The method herein described of forming a rubber stencil sheet which consists in superposing upon an uncompressible mould member having a recess in its otherwise plane face with a plane-faced design rising in relief within the said recess to a height equal to the depth of the recess, first, an imperforate blank of green rubber of outline and thickness corresponding to the outline and depth of the recess, and in position in registry with such recess, second, a sheet of Holland, and, third, a backing of yielding material, and then bringing a plane-faced and incompressible mould member to bear with pressure upon the charge so arranged, and by pressure so exerted driving substantially all of the rubber from the face of the design and accumulating substantially all of the rubber within the said recess and around such raised design, and, after such migration and accumulation of the rubber, and while the material continues under pressure within the mould, effecting its vulcanization.

4. The method herein described of forming a rubber stencil sheet which consists in pressing upon an incompressible mould member having a shallow recess in its otherwise plane surface, with a design rising in relief within such recess to a height equal to the depth of the recess, and beneath a companion incompressible plane-faced mould member faced with a layer of yielding material, a blank of green sheet rubber of uniform and unbroken thickness and of outline and thickness corresponding to the outline and depth of the said recess, such blank being positioned in registry with the said recess, and in so doing causing the rubber to migrate with substantial completeness from above the design and to accumulate within the recess and around the sides of said design, vulcanizing the blank when so shaped within the mould, opening the mould, abraiding away, while the vulcanized article remains in situ in the recessed mould member, the remnant membrane of rubber upon the face of the design, and, finally, stripping the perforate article from the mould member.

In testimony whereof we have hereunto set our hands.

JAMES H. MATTHEWS.
LEE M. HARLEY.